United States Patent [19]
Duey et al.

[11] Patent Number: 5,507,097
[45] Date of Patent: Apr. 16, 1996

[54] APPARATUS FOR MEASURING THE ACCURACY OF PARALLEL PLATEN TIE BARS

[75] Inventors: David H. Duey, Westland; John A. Battista, Northville, both of Mich.

[73] Assignee: Intra Corporation, Westland, Mich.

[21] Appl. No.: 404,556

[22] Filed: Mar. 15, 1995

[51] Int. Cl.⁶ .................................................. G01B 11/26
[52] U.S. Cl. ........................... 33/286; 33/DIG. 21; 100/99
[58] Field of Search .......................... 33/293, 286, 529, 33/533, 645, 655, DIG. 1, DIG. 21; 425/169; 100/46, 99, 258 A; 356/152.1, 153

[56] References Cited

U.S. PATENT DOCUMENTS

| | | | |
|---|---|---|---|
| 2,638,676 | 5/1953 | Callahan | 33/645 |
| 2,656,607 | 10/1953 | Harding | 33/655 |
| 4,195,563 | 4/1980 | Budraitis et al. | 100/99 |
| 4,696,190 | 9/1987 | Bucher et al. | 33/533 |
| 4,709,485 | 12/1987 | Bowman | 33/286 |
| 4,907,881 | 3/1990 | Jones | 33/286 |
| 5,077,905 | 1/1992 | Murray, Jr. | 33/DIG. 21 |
| 5,148,232 | 9/1992 | Duey et al. | 356/152.1 |
| 5,328,346 | 7/1994 | Kodric | 100/258 A |

Primary Examiner—William A. Cuchlinski, Jr.
Assistant Examiner—G. Bradley Bennett
Attorney, Agent, or Firm—Alex Rhodes

[57] ABSTRACT

A laser apparatus for inspecting machine tie bars. The apparatus broadly comprises a laser emitter, a photocell target, a control unit, a computer, a display unit and precision adapters for mounting the emitter and target. The laser emitter is mounted on a fixed platen and oriented substantially square to a surface of the fixed platen. The target is mounted on the tie bar and intercepts a laser beam from the emitter to generate voltages which are processed in the control unit and computer. Angular and lateral deviations of the laser beam from a rotational axis of the target, which are indicative of tie bar straightness and squareness, are displayed on the display unit.

15 Claims, 2 Drawing Sheets

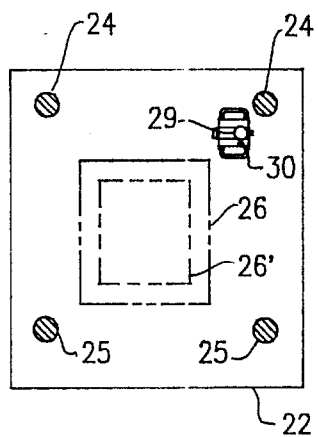
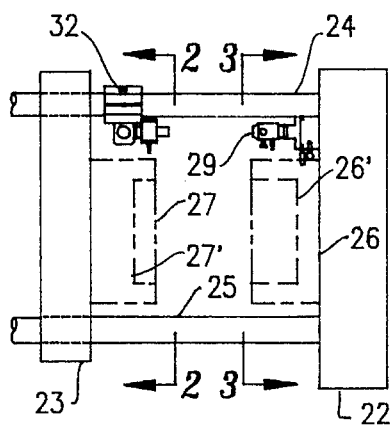
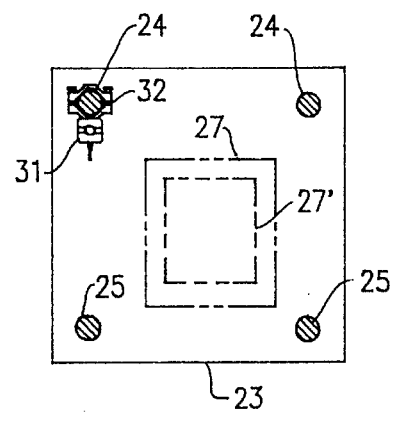
FIG. 3
FIG. 1
FIG. 2
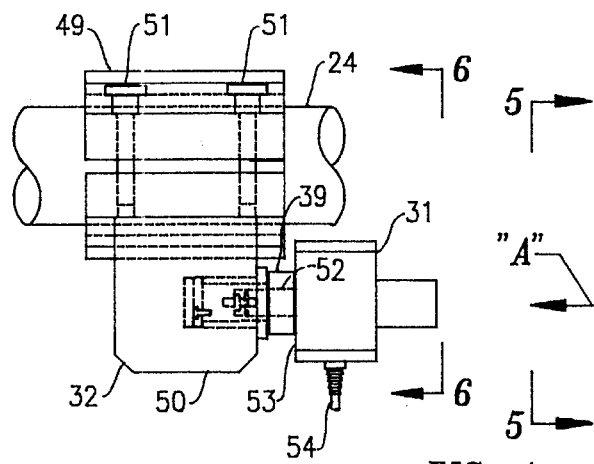
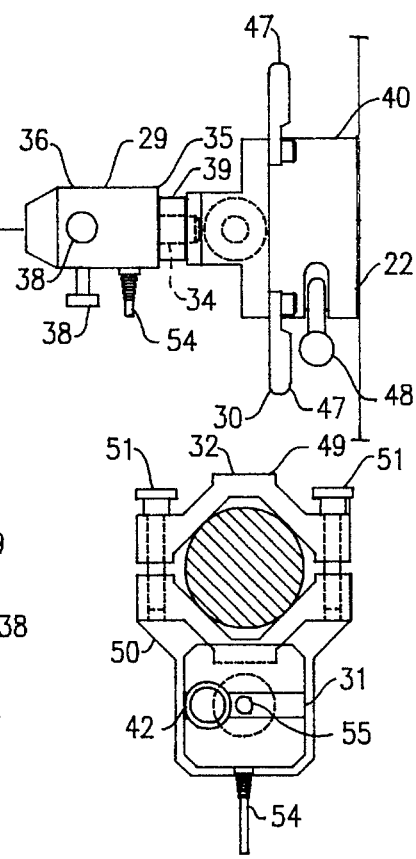
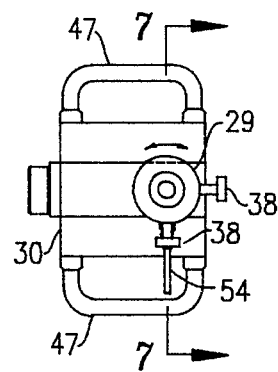
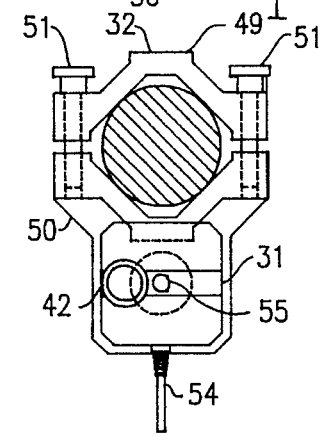
FIG. 7
FIG. 5
FIG. 6

5,507,097

APPARATUS FOR MEASURING THE ACCURACY OF PARALLEL PLATEN TIE BARS

FIELD OF THE INVENTION

This invention relates to machine alignment and more particularly to an apparatus for inspecting the straightness and squareness of machine platen tie bars.

BACKGROUND OF THE INVENTION

The quality control of plastic injection molding machines, die casting machines, and others depends on the alignment of a movable platen with a parallel stationary platen. The movable platen is slidable on slender cylindrical tie bars, each of which is rigidly attached at end portions. Dies or molds which are mounted on the platens are opened and closed by sliding the movable platens on the tie bars.

If tie bars are not straight or at right angles to the fixed platens, platen misalignment occurs, causing the dies or molds to be misaligned and part quality to deteriorate.

Poor part quality adversely affects a manufacturer's reputation, increases its warranty costs and sometimes results in an expensive product recall. It can also increase manufacturing costs by requiring secondary operations and increase machine wear, causing additional maintenance and lost production.

Inspections of tie bar squareness and straightness with mechanical equipment, such as dial indicators, is difficult and time consuming. In our pending U.S. application Ser. No. 08/286,342, a laser apparatus and method were disclosed for inspecting the alignment of the movable platen with the fixed or stationary platen. If platens are found to be misaligned, the cause of the misalignment must be identified.

A need exists for inspecting tie bars, a common source of platen misalignment. Inspections of tie bar straightness and squareness, with mechanical equipment such as dial indicators is difficult and time consuming because of set-up times and lengths of the tie bars.

Some manufacturers are reluctant to inspect tie bar straightness and squareness because it is difficult and time consuming. Instead, part quality is sacrificed, machines obsoleted or expensive tie bar teardown and rebuilding (T & R) procedures are performed. Expensive T & R's could be avoided if an effective and easy to use apparatus was available for inspecting the tie bars.

An effective and easy to use apparatus for inspecting tie bars would also assist a manufacturer in planning and scheduling machine maintenance. It would also assist a manufacturer of machinery in maintaining quality control.

SUMMARY OF THE INVENTION

The object of the present invention is therefore to provide an effective, easy to use apparatus for inspecting tie bar straightness and squareness which, owing to the invention's advantages, will assist a manufacturer in controlling costs and improving product quality. If a machine's tie bars are found to be acceptable, the apparatus allows the manufacturer to perform simpler repairs such as shims, etc. for aligning a machine's platens, rather than machine obsolescence or expensive maintenance procedures.

For that purpose the invention has for its subject matter a laser apparatus for inspecting the straightness and squareness of tie bars.

One benefit of the invention is that tie bars can be quickly inspected. Another benefit, in addition to the foregoing benefit, is that the degree of operator skill for inspecting tie bars is reduced.

Another benefit, in addition to the foregoing benefits, is that it is applicable to large machines having long tie bars.

The laser apparatus broadly comprises a laser emitter, a photocell target, a control unit, a computer, a display unit and precision adapters for mounting the emitter and target. The control unit includes a power supply and an electronic componentry for converting analog output signals from the target to digital and for setting the calibration constants of the emitter and target. A printer for producing hard copies of the results is optional.

The computer is programmed to provide a step-by-step procedure for inspecting tie bar straightness and squareness; to process signals from the control unit; and to display information which is indicative of tie bar straightness and squareness. The computer and display unit may be combined in a single unit.

Further benefits and features of the invention will become apparent from the ensuing detailed description and drawings which disclose the invention. The property in which exclusive rights are claimed is set forth in each of the numbered claims at the conclusion of the detailed description.

BRIEF DESCRIPTION OF THE DRAWINGS

The invention will be better understood and further objects, characterizing features, details and advantages thereof will appear more clearly with reference to the diagrammatic drawings illustrating a presently preferred specific embodiment of the invention by way of non limiting example only.

FIG. 1 is a side elevational view showing fixed and movable platens interconnected by upper and lower tie bars and a laser emitter and target for inspecting a tie bar.

FIG. 2 is a cross-sectional view taken on the line 2—2 in FIG. 1.

FIG. 3 is a cross-sectional view taken on the line 3—3 in FIG. 1.

FIG. 4 is an enlarged side elevational view of the laser emitter, target and their mounting adapters.

FIG. 5 is a cross-sectional view taken on the line 5—5 in FIG. 4.

FIG. 6 is a cross-sectional view taken on the line 6—6 in FIG. 4.

FIG. 7 is a cross-sectional view taken on the line 7—7 in FIG. 5.

DETAILED DESCRIPTION OF THE PREFERRED EMBODIMENT

Figure 8:
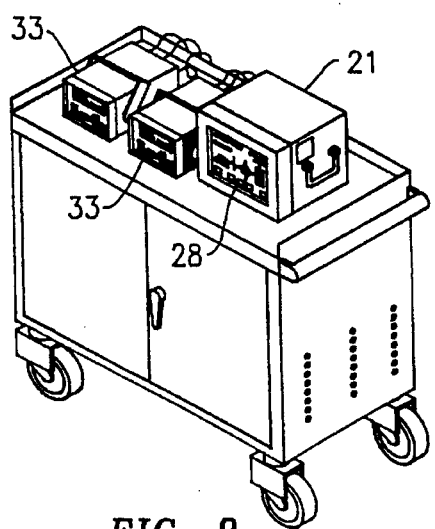
FIG. 8 is a perspective view of a pair of control units and a computer according to the invention.

Referring now to the drawings wherein like numerals designate like and corresponding parts throughout the several views, in FIGS. 1 through 3, inclusive, are shown a fixed 22 and a movable 23 platen connected by a pair of upper 24 and lower 25 tie bars, a laser emitter 29, a target 31, and adapters 30, 32 for mounting the laser emitter 29 and target 31. The platens 22, 23 and tie bars 24, 25 are typical of the platens and tie bars used in machines, such as plastic molding and die casting machines.

Figure 9:
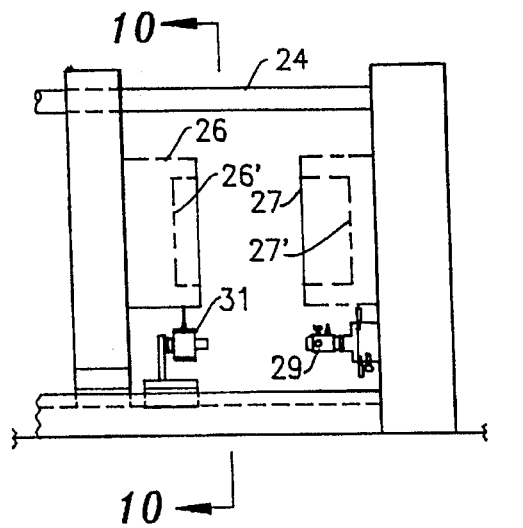
FIG. 9 is a side elevational view showing a fixed and a movable platen interconnected by upper tie bars and lower guideways and a laser emitter and target mounted in adapters for inspecting the guideways.
Figure 10:
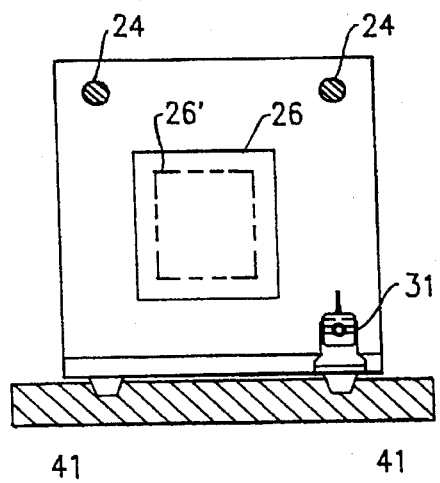
FIG. 10 is a cross-sectional view taken on the line 10—10 in FIG. 9.
Figure 12:
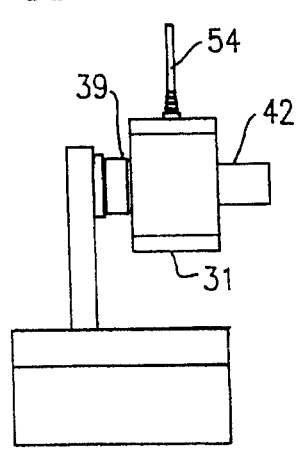
FIG. 12 is a side view of the adapter shown in FIG. 11.
Figure 11:
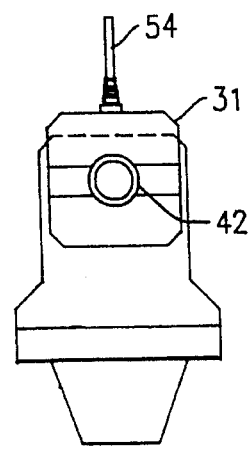
FIG. 11 is a front view drawn to an enlarged scale of the adapter in FIG. 10 for mounting the target.

The tie bars 24, 25 are rigidly attached and are at right angles to the platens 22, 23. With reference to FIGS. 9 and 10, in some machines, particularly large machines, guideways 41, rather than tie bars, are used to support and guide the lower portions of movable platens.

In FIGS. 1–3, a cover portion 26 and an ejector portion 27 of a mold. The cover 26 and ejector 27 portions have cavities 26' and 27' into which liquid plastic is injected to produce a finished part. It will be observed that the vertical faces of the cover 26 and ejector 27 portions must be accurately aligned when the mold is closed to align the cavities 26' and 27' and prevent excess plastic from flowing out of the mold.

The faces of the platens 22, 23 are typically precision machined. The mold is closed by sliding the movable platen 23 on the tie bars 24, 25 to bring the ejector portion 27 in contact with the cover portion 26. After liquid plastic is injected, the ejector portion 27 is moved on the tie bars 24, 25 away from the cover portion 26 to open the mold and eject a finished part.

If a tie bar 24, 25 is not straight or square to the platens 22, 23, the mold may not completely close and/or will be misaligned. If the mold does not completely close, excess plastic ("flash") will exude from the mold and a secondary operation will be required to trim the flash, thereby adding to the cost of the part. Also, appearance and function of the finished part will be adversely affected. Still further, friction will increase between the ties bars 24, 25 and their bushings, accelerating tie bar and bushing wear, and causing premature service of the machine.

The present invention generally comprises the laser emitter 29, the emitter adapter 30, the photocell target 31, the target mounting adapter 32, an electronic control unit 33 and a computer 21.

The laser emitter 29, target 31, electronic control unit 33 and computer 21 in the drawings are components of the Intra Corporation of Westland, Mich., QB-8000 laser system, it being understood that similar components can be used for practicing our invention.

The Intra Corporation QB-8000 laser emitter 29 is a low power semi-conductor FDA Class 2 semi-conductor type laser which emits a highly collimated and visual beam "A". When the laser beam "A" strikes the target 31, voltages are generated which vary in accordance with the position of the centroid of beam "A" with respect to the center of a photocell in the target 31. The visual beam "A" is convenient for rough aligning the emitter 29 with the target 31.

With reference to FIG. 7, a detachable cylindrical post 34 is attached to a rear face 35 of the emitter's body 36, referred to herein as the emitter control face 35. The location of the emitter control face 35 with respect to the rotational axis of the emitter body 36 is closely controlled.

The emitter post 34 of the QB-8000 laser system is detachable to allow the use of other mountings. In the center of the post 34 is a tapped hole 37 for attaching the emitter 29 to the mounting adapter 30.

On the body 36 of the emitter 29 are two thumb screws 38 for aligning (i.e. qualifying) the laser beam "A" with respect to the rotational axis of the laser emitter 29. The thumb screws 38 adjust the angle of the laser beam "A" with respect to the rotational axis.

The target 31 is a two dimensional lateral effects target which generates four voltages when the photocell is struck by the laser beam "A". The four voltages are indicative of the angular deviation and lateral displacement of the laser beam "A". The voltages are transmitted to the electronic control unit 33 where they are digitized and transmitted to the computer 21. The digitized voltages are processed in the computer 21 and displayed on a screen.

On the front of the target 31 there is a telescope 42 which is used for measuring the angular deviation of the laser beam "A" from the rotational axis of the target 31. The telescope 42 is slidable on the target 31 whereby it can be positioned in the path of the laser beam "A" when the angular deviation of the beam "A" is measured. The telescope 42 is comprised of a plano-convex lens and a double concave lens. When the laser beam "A" enters the telescope 42, the lenses focus the beam "A" to a point in the plane of the photocell. The target 31 also has a cylindrical post 52 and a control face 53.

The QB-8000 system is available with a conventional PC type computer (laptop or desktop) and a separate display unit or the Intra Corporation "touch screen" computer 21, depicted in FIG. 8. On the "touch screen" 28 is a simulated key pad which is used to input numerical data and a command menu for executing commands.

The electronic control unit 33 supplies power to the laser emitter 29 and target 31. It includes an analog to digital (A to D) converter and electronics for factory pre-settings of laser emitter and target calibration constants.

A program, stored in the computer 21, provides step-by-step instructions on the "touch screen" 28 for qualifying the laser beam "A" and inspecting a tie bar. Numerical data is entered into the computer and commands are executed by touching key pad and command menu buttons. Deviations in straightness and squareness are displayed on the "touch screen" in inches per foot or graphical form. The QB-8000 system which is depicted in FIG. 8 has a pair of control units 33 for operating a pair of laser emitters 29.

One feature of our invention which is also disclosed in our pending application Ser. No. 08/286,342, is a "pull-back" 55 for clamping the control faces 35, 53 of the emitter 29 and target 31 in their respective adapters 30, 32. The "pull-back" feature 55 eliminates the error which occurs when the post 34 is used because of clearance. The error is eliminated by using the control faces 35, 53 to locate the emitter 29 and target 31.

The "pull-back" feature 55 is best understood by reference to FIG. 7 taken on the line 7—7 in FIG. 5. In the emitter adapter 30, there is an aperture 44 which receives a close fitting sleeve 43. The close fitting sleeve 43 is fixed to the adapter 30 and receives a collar bushing 39 which is rotatable in the sleeve 43. A collar bushing 39 is held in the sleeve 44 by a circular plate 46 which is attached to an inner end portion of the collar bushing 39.

In the center of the collar bushing 39 is a "pull-back" stud 45 which is attached at one end thereof to the plate 46. The stud 45 extends outwardly from the plate 46 to engage the emitter's mounting post 34 and clamps the control face 35 against the collar bushing 39.

Referring now to FIGS. 4 and 5, the emitter adapter 30 is comprised of a magnetic base 40, a pair of handles 47 mounted on opposite sides of the base 40, a pair of collar bushing 39, and an actuating lever 48. The "pull-back" feature 55 is also included in the target adapter 32.

The construction of the target adapter 32 is best understood by reference to FIGS. 4 and 6. The adapter 32 is comprised of an upper V-block 49, a lower V-block 50, two pairs of thumb screws 51. In the lower V-block 50 is the "pull-back" feature 55 for mounting the photocell target 31.

The target adapter 32 is attached to the tie bar 24 by engaging the upper V-block 49 and lower V-block 50 with the tie bar 24 and clamping the V-blocks to the tie bar 24 with the thumb screws 51. The target mounting post 52 is also detachable.

The steps in inspecting the straightness and squareness of the tie bar 24 are as follows:

Inspecting the Straightness and Squareness of a Tie Bar FIGS. 1–4

1. Mount the target adapter 32 on the tie bar 24.
2. Mount the target 31 in the adapter 32 pointing in the direction of the tie bar 24, toward the fixed platen 22.
3. Install the laser emitter 29 in the emitter adapter 30.
4. Mount the emitter adapter 30 on the fixed platen 22 with the emitter 29 pointing in the direction of the target 31.
5. Connect the emitter 29 and target 31 to the electronic control unit 33.
6. Mark off increments on the tie bar 24 where straightness measurements are to be made.
7. Enter the length of an increment and the combined lengths of the increments into the computer using the key pad of the "touch screen".
8. Position the target 31 at the first increment.
9. Rotate the laser emitter 29 and target 31 to position the emitter and target wire harnesses 54 at 6:00 o'clock.
10. Rough align the laser emitter 29 with the target 31, using the visual laser beam "A".
11. Qualify that the laser beam "A" is parallel to the rotational axis of the laser emitter 29.
12. With the target's telescope 42 in the path of the laser beam "A", position the target wire harness 54 at 6:00 o'clock (for straightness measurement).
13. Transmit the target voltages to the control unit 33.
14. Move the target 31 on the tie bar 24 to each successive increment (maintaining the wire harness at 6:00 o'clock) and repeat step 13 at each increment.
15. Display the "X" and "Y" components of deviations of straightness in tabular or graphical form on the "touch screen" 28.

The steps are performed in the following manner.

With reference to FIGS. 1 through 4, inclusive, the target adapter 32 is first clamped to the tie bar 24 with the thumb screws 51 (Note: the target's telescope 42 points in the direction of the tie bar 24 and towards the fixed platen 22).

The target 31 is mounted in the adapter 32 by rotating the target 31 to engage the target's control face 53 with the adapter collar bushing 39. The laser emitter 29 is mounted in the emitter adapter 30 by rotating the emitter 29 to engage the emitter's control face 35 with the adapter collar bushing 39.

Using the adapter handle 41, the adapter 30 and emitter 29 are positioned at about the same level as the target 31, with the emitter 29 pointing in the direction of the tie bar 24 and toward the target 31 and magnetically attached to the fixed platen 22 by rotating the lever 47.

The emitter 29 and target 31 wiring harnesses 54 are connected to the electronic control 33 to activate the emitter 29 and target 31. The emitter 29 is rough aligned with the target 31 by adjusting the positions of the emitter 29 and target 31 until the visible laser beam "A" enters the target's entrance aperture 55.

Increments are marked on the tie bar 24 where straightness measurements are to be made. The length of an increment and the combined lengths of the increments are entered into the computer using the key pad of the "touch screen".

The emitter 29 and target 31 are rotated in their adapters 30, 32 to position their wire harnesses 54 (as shown in FIGS. 5 and 6) at 6:00 o'clock.

The laser emitter 29 is then qualified to insure that the laser beam "A" is parallel to the axis of rotation of the laser emitter 29. During the qualification, the telescope 42 is positioned in the path of the laser beam "A" by sliding the telescope 42 on the target 31.

In succession, the laser emitter 29 is rotated to position the wiring harness 54 at 6:00 o'clock, at 12:00 o'clock, and 6:00 o'clock. At each position the target voltages are transmitted to the control unit 33. The laser beam "A" is then aligned ("qualified") with the axis of rotation of the laser emitter 29 by rotating the adjustment screws 38 of the emitter 29 to zero out the final "X" and "Y" component readings on the "touch screen" 28.

After the laser emitter 29 has been qualified, the target adapter 32 is positioned with the wiring harness 54 at 6:00 o'clock the target adapter 32 and target 31 are positioned at each increment on the tie bar 24 beginning with the first increment. At each increment, with the wiring harness at 6:00 o'clock, the target voltages are transmitted to the control unit 33. The straightness of the tie bar 24, expressed as the "X" and "Y" components of the angular deviation of the laser beam "A" from the axis of the target versus target position, is displayed on the "touch screen" 28 in tabular or graphical form.

The squareness of the tie bar 24 is checked by determining the slope of the laser beam "A" with respect to the target 31. The slope is determined as follows. With the telescope 42 out of the path of the laser beam "A", and the wiring harness 54 of the target 31 at a 6:00 o'clock position, the target's output voltages are transmitted to the electronic control unit 33. The target voltages with the telescope out of the path of the laser beam are indicative of the "X" and "Y" displacements of the centroid of the laser beam "A" from the center of the photocell in the target 31. The target 31 is moved to a second position and the distance between positions is entered into the computer. The target voltages at the second position are transmitted to the computer. The target voltages at the two positions and distance between the positions are processed in the computer to display the vertical and horizontal slope in inches per foot of the laser beam "A" on the "touch screen" 28.

From the foregoing it will be appreciated that our invention provides an efficient, easy to use, highly accurate apparatus and method for inspecting the straightness and squareness of a tie bar on which a movable platen is slidable.

Although but a single embodiment of our invention has been disclosed, it is not our intention to limit the scope of our invention to this embodiment since other embodiments can be developed by changes, such as changes in materials, size, arrangement, number and shapes of parts, and sequence of steps without departing from the spirit thereof.

We claim:

1. A laser apparatus for inspecting a tie bar of a machine comprising: a laser emitter for transmitting a collimated laser beam; an adapter for mounting said laser emitter on a surface of a fixed platen of the machine such that said laser beam is substantially square with said surface of said fixed platen of said machine; a target mounted on said tie bar for intercepting said laser beam to produce output voltages which are indicative of the deviation in straightness of said tie bar at the position of said target on said tie bar; an adapter for mounting said target at alternate longitudinal positions on said tie bar and orienting said target to intercept said laser beam at each of said alternate positions; and a means for processing said voltages at each of said longitudinal positions to determine the straightness of said tie bar.

2. The laser apparatus recited in claim 1 wherein said means for processing said output voltages of said target at each of said longitudinal positions on said tie bar is comprised of a means for digitizing said voltages and a means for processing said digitized voltages to determine said straightness and said squareness of said tie bar.

3. The laser apparatus recited in claim 1 wherein said laser emitter projects a visible light laser beam for rough aligning said laser emitter with said target.

4. The laser apparatus recited in claim 1 further comprising a magnetic means for mounting said emitter adapter on said platen of said machine.

5. A laser apparatus for inspecting the straightness and squareness of a tie bar of a machine comprising: a laser emitter for transmitting a narrow collimated laser beam, said laser emitter having a control surface which is substantially perpendicular to a centroid of said collimated laser beam; an adapter for mounting said laser emitter on a surface of a fixed platen of the machine and orienting said laser beam substantially perpendicular to said surface of said fixed platen; a target for intercepting said laser beam to produce output voltages which are indicative of the position of said centroid of said laser beam from the center of a photocell of said target or are indicative of the straightness of said tie bar; an adapter for mounting said target at alternate longitudinal positions on said tie bar and orienting said target to intercept said laser beam at each of said alternate positions; and a means for processing said voltages at each of said longitudinal positions to determine the straightness or squareness of said tie bar.

6. The apparatus recited in claim 5 further comprising a "pull back" means in said emitter adapter for accurately orienting said laser beam perpendicular to said face of said fixed platen of said machine.

7. The laser apparatus recited in claim 6 further comprising a means for processing voltage output signals of said target and a means for displaying information which is indicative of the straightness and squareness of said tie bar.

8. The laser apparatus recited in claim 5 wherein said adapter for mounting said target on said tie bar is comprised of an upper V-block; a lower V-block; and a means for clamping said V-blocks on the tie bar.

9. A laser apparatus for inspecting the straightness and squareness of a tie bar of a machine comprising: a laser emitter for projecting a collimated laser beam; a means for mounting said emitter on a surface of a fixed platen of the machine and orienting said emitter to project said collimated laser beam such that a centroid of said laser beam is substantially perpendicular to said surface of said fixed platen; a photocell target for intercepting said laser beam and produce voltages which are indicative of angular and lateral deviations of said centroid of said laser beam from a center of said photocell of said target; and a means for mounting said target at alternate longitudinally spaced positions on said tie bar.

10. The laser apparatus recited in claim 9 further comprising a means for processing said voltage which are indicative of said deviations of said laser beam to display said deviations on a display unit; and a display unit for displaying said deviations.

11. The laser apparatus recited in claim 9 further comprising a means for inspecting the straightness and squareness of a guideway for supporting and guiding the lower portion of said movable platen, said means including an adapter for mounting said target at various positions in said guideway.

12. A method for inspecting machine tie bars comprising the steps of: mounting a laser emitter on a fixed platen of a machine to project a laser beam in a direction which is substantially perpendicular to a fixed platen of said machine; mounting a photocell target on a tie bar of said machine at a first position for intercepting said laser beam; projecting the laser beam from said laser emitter toward said target to intercept the photocell in said target and generate voltages which are indicative of the straightness of said tie bar at said first position; processing said voltages from said target to determine the deviation of said tie bar in straightness at said first position; longitudinally moving said target on said tie bar to a second position for intercepting said laser beam at said second position; projecting a laser beam from said laser emitter toward said target at said second position to intercept said photocell in said target and generate voltages which are indicative of the straightness of said tie bar at said second position; processing said voltages from said target at said second position to determine the deviation of said tie bar in straightness at said second position; and visually displaying said deviations, said deviations being indicative of said straightness of said tie bar at said first and second positions of said target.

13. A method for inspecting machine tie bars comprising the steps of: mounting a laser emitter on a fixed platen of a machine to project a laser beam in a direction which is substantially perpendicular to a fixed platen of said machine; mounting a photocell target at longitudinally spaced apart positions on a tie bar of said machine for intercepting said laser beam at each target position; projecting the laser beam at each target position toward said target to intercept the photocell in said target and generate voltages which are indicative of the straightness of said tie bar at said position; processing said voltages at each of said target positions to determine the deviation in straightness of said tie bar at each of said positions; and visually displaying said deviations, said deviations being indicative of said straightness of said tie bar at each of said positions of said target.

14. The method for inspecting machine tie bars recited in claim 13 further comprising the further steps of inspecting the straightness and squareness of a guideway which supports and guides a lower portion of said platen, said steps comprising mounting an adapter in a said guideway, mounting said target in said adapter; mounting a photocell target in said adapter to intercept a laser beam from said emitter; positioning said adapter at longitudinally spaced apart positions on said guideway to intercept said laser beam at each target position; projecting the laser beam at each target position toward said target to intercept said photocell in said target and generate voltages which are indicative of the straightness of guideway at said position; processing said voltages at each of said target positions to determine the deviation in straightness of said guideway at each of said positions; and visually displaying said deviations, said deviations being indicative of said straightness of said guideway at each of said positions of said target.

15. A method for inspecting machine tie bars comprising the steps of: mounting a laser emitter on a fixed platen of a machine to project a laser beam in a direction which is substantially perpendicular to a fixed platen of said machine; mounting a photocell target at two longitudinally spaced apart positions on a tie bar of said machine for intercepting said laser beam; at each position of said target projecting the laser beam from said target emitter toward said target to intercept the photocell in said target and generate voltages which are indicative of the position of a centroid of said laser beam with respect to a center of said photocell; processing said voltages from said target at each of said target locations to determine the position of said centroid of said laser beam with respect to said center of said photocell at each of said locations; determining the slope of said tie bar between said two target locations by dividing the difference in location of the said centroid of said laser beam with respect to said center of said photocell by the longitudinal distance between said positions; displaying said slope, said slope being indicative of the squareness of said tie bar with respect to said fixed platen.

* * * * *